July 14, 1931.                E. L. BEECHER                1,815,002
               CONNECTER FOR HYDROSTATIC CONDUITS
                       Filed Aug. 1, 1929
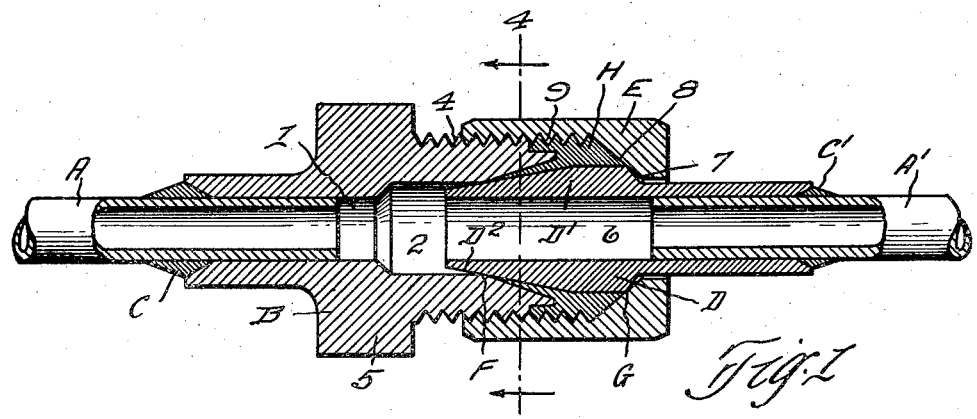
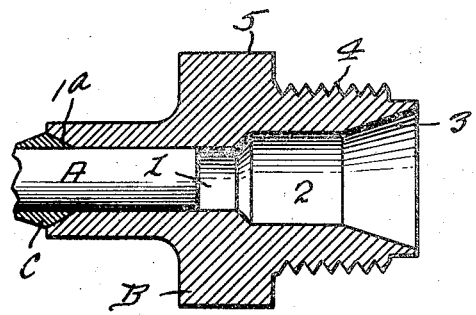 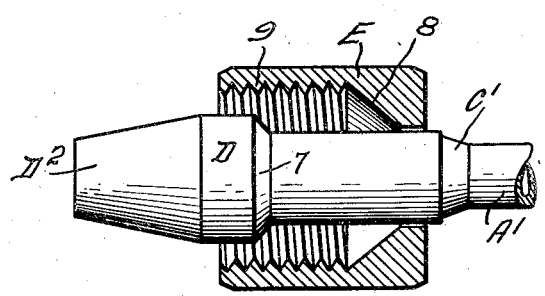
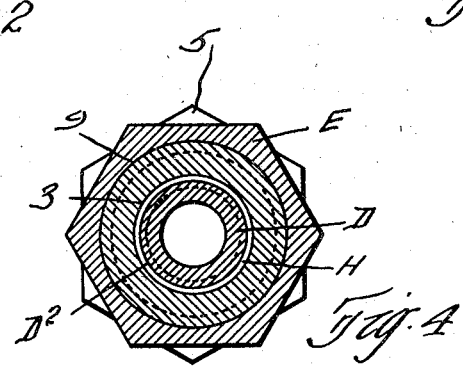

Patented July 14, 1931

1,815,002

UNITED STATES PATENT OFFICE

EUGENE L. BEECHER, OF CLEVELAND, OHIO, ASSIGNOR TO THE GABRIEL COMPANY, OF CLEVELAND, OHIO, A CORPORATION OF OHIO

CONNECTER FOR HYDROSTATIC CONDUITS

Application filed August 1, 1929. Serial No. 382,672.

This invention relates to means for connecting conduit sections, and more particularly to means for connecting the sections of a hydrostatic conduit which is employed to transmit to a gauge the pressure due to the head of a liquid the height of which head is to be determined by the gauge.

The general purpose and object of the invention is to provide a connecter which will form an effective seal against the escape of gas by means of a metal-to-metal contact. A further object of the invention is to provide a connecter of this character wherein the metal-to-metal contact consists of a circular line, the circle being of small diameter, whereby the parts in contact may be readily separated whenever the occasion may require.

I accomplish the foregoing objects in and through the construction and arrangement of parts shown in the drawings, wherein Fig. 1 represents a longitudinal sectional view through my connecter, showing the same applied to adjacent ends of conduit sections; Fig. 2 is a detail in section of one of the members of the connecter and the attached end of the cooperating conduit section; Fig. 3 is a detail in elevation of the connecting member applied to the other conduit section, the retaining nut being shown in section; and Fig. 4 a detail in section corresponding to the line 4—4 of Fig. 1.

Describing the various parts by reference characters, A and A' denote the two conduit sections to be connected. The section A is provided with a connecting member comprising a metallic body B, the said body having a bore therethrough the portions of which are indicated at 1, 2 and 3. The portion 1 of the bore receives therein the end of the conduit section A, the outer end of the bore being flared, as shown at 1ª, to receive solder or other sealing material, indicated at C. The bore section 1 merges with the larger bore section 2 and the latter in turn merges with the outwardly flaring frusto conical bore section 3. For convenience of description, the end of the member B which is provided with the outwardly flaring bore section 3 will be referred to as the "front" end and the opposite end as the "rear" end. The connecting member B is provided adjacent its front end with an external thread 4 and, at the rear of said thread, with a hexagonal projection 5 for the reception of a wrench.

The conduit section A' is fitted within the bore 6 of a connecting member D. For convenience of description the end of the connecting member D which is presented toward the member B will be referred to as the "front" and its opposite end as the "rear" end. The rear end of the connecting member D is formed into a sleeve of relatively small diameter, and the joint between the end of the said sleeve and the conduit section A' is closed by solder or other suitable material indicated at C'. The sleeve merges with the enlarged front body portion D' by means of an outwardly flaring frusto conical surface 7; and the front end of the enlarged body portion D' of this connecting member has a frusto conical exterior, as indicated at D², the front end of the said frusto conical portion being of less diameter than the bore section 2 whereby it may be received therewithin.

Surrounding the sleeve of the member D and adapted to extend across the frusto-conical surface 7 of the said connecting member is the flanged rear end of a third connecting member E, the same being formed as a retaining nut provided within the rear portion thereof with an outwardly flaring frusto conical surface 8 merging with the extended threaded bore 9, the internal thread on the nut being adapted to mesh with the thread 4 on the connecting member B.

The diametrically opposite portions of the bore section 3 form an angle of approximately 30°, while the diametrically opposite portions of the tapered surface D² of the member D form an angle of approximately 21° whereby, when the part D² is inserted within the bore section 3, there will be only a circular line of contact between the members B and D, this line contact occurring at F—the junction between the bore sections 2 and 3.

In practice, the connecting member D is of softer material than the connecting member B so that, by setting up the nut E, the member D will receive a circular indentation of small contact area. In practice, I have found that phosphor bronze may be employed with advantage for the member B while manganese bronze, which is about 50% softer than phosphor bronze, may be employed for the member D.

It will be noted further that the angle formed between diametrically opposite portions of the tapered surface 8 in the nut E is less than the angle formed between diametrically opposite portions of the tapered surface 7 on the rear end of the enlarged portion of the connecting member D. By this arrangement, when the nut E is set up, an additional indentation circle G will be formed in the surface 8 by the contacting front end of the surface 7, the nut E being made of softer material than that employed for the connecting member D. In practice good results have been secured by employing yellow brass for the nut E, which material is about one-third softer than the manganese bronze which I have employed for the member D.

As a further prevention against leakage, the space between the two contact circles F and G is filled with pipe-joint compound, indicated at H; but leakage will ordinarily be effectively prevented by the double-contact seal provided at F and G, even though the pipe compound will aid in preventing any leakage through the threads.

From the foregoing description, it will be noted that the three parts comprising the connecter are made of materials having different degrees of hardness and that the double seals are formed with a minimum circular contact area F and G between the members, which not only facilitates the easy separation of the parts when the nut is backed off, but assures perfect metal-to-metal circular contact with a minimum tightening of the nut E.

Having thus described my invention, what I claim is:—

1. As a means for connecting a pair of conduit sections, a connecting member adapted to be secured to an end of one of said sections and having a bore therethrough, the rear of the bore being of outwardly flaring frusto-conical form, a connecting member adapted to be secured to an end of the other conduit section and having a bore therethrough, the exterior of the second member being formed into a head having at the rear thereof a forwardly and outwardly flaring frusto-conical surface and having at the front thereof an inwardly tapered frusto-conical surface, the front end of said head being of less external diameter than the rear of the frusto-conical portion of the bore of the first member, and a retaining nut mounted on the second member and having within the rear portion thereof an outwardly flaring frusto-conical surface of less angularity than the frusto-conical surface at the rear of said head, whereby the front end of the rear frusto-conical surface of the head will engage the frusto-conical surface of the nut in a line contact, the said nut being adapted to be threaded on the adjacent end of the first member, the first member being of harder material than the head of the second member and the head of the second member being of harder material than the retaining nut whereby circular indentations of small contact area will be formed where the front end of the head engages the front end of the frusto-conical bore of the first member and where the top of the frusto-conical surface at the rear of the head engages the frusto-conical surface in the retaining nut.

2. As a means for connecting a pair of conduit sections and in combination with said sections, a connecting member secured to an end of one of said sections and having a bore therethrough, a connecting member secured to an end of the other conduit section and having a bore therethrough, the exterior of the second mentioned member being formed into a head having at the rear thereof a forwardly and outwardly flaring frusto-conical surface and having a surface adapted to abut against a surface of the first member, and a retaining nut mounted on the second member and having within the rear portion thereof an outwardly flaring frusto-conical surface of less angularity than the frusto-conical surface at the rear of said head whereby the front end of the frusto-conical surface of the head will engage the frusto-conical surface of the nut in a line contact, the said nut being adapted to be threaded on the adjacent end of the first member, the head of the second member being of harder material than the retaining nut whereby a circular indentation of small contact area will be formed where the top of the frusto-conical surface at the rear of the head engages the frusto-conical surface in the retaining nut.

3. As a means for connecting a pair of conduit sections, a connecting member adapted to be secured to an end of one of said sections and having a bore therethrough, the rear of the bore being of outwardly flaring frusto-conical form, a connecting member adapted to be secured to an end of the other conduit section and having a bore therethrough, the exterior of the second mentioned member being formed into a head having at the rear thereof a forwardly and outwardly flaring frusto-conical surface and having at the front end thereof an inwardly tapered frusto-conical surface, the front end of said head being of less external diameter than the rear of the frusto-conical portion of the bore of the first member, and a retaining nut mounted on the second member and having within the rear portion thereof an outwardly flaring frusto-conical surface of less angularity than the frusto-conical surface at the rear of said head, whereby the front end of the rear frusto-conical surface of the head will engage the frusto-conical surface of the nut in a line contact, the said nut being adapted to be threaded on the adjacent end of the first member, the first member being of harder material than the head of the second member and the head of the second member being of harder material than the retaining nut whereby circular indentations of small contact area will be formed where the front end of the head engages the front end of the frusto-conical bore of the first member and where the top of the frusto-conical surface at the rear of the head engages the frusto-conical surface in the retainer nut, and sealing material within the nut and surrounding the portion of the head and the end portion of the first connecting member therewithin.

In testimony whereof, I hereunto affix my signature.

EUGENE L. BEECHER.